Jan. 22, 1963    C. DOBELL    3,074,584
PRESSURE VESSEL
Filed Sept. 28, 1959    3 Sheets-Sheet 1
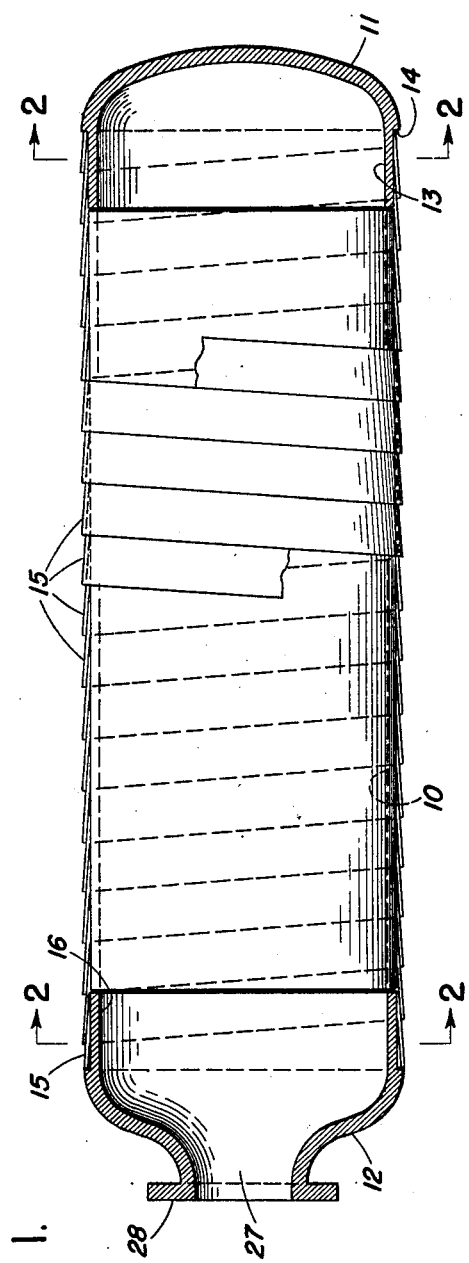
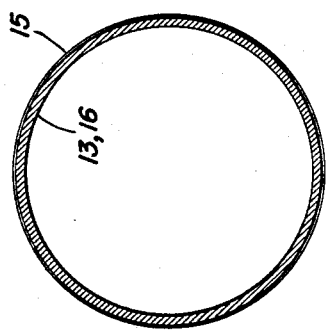
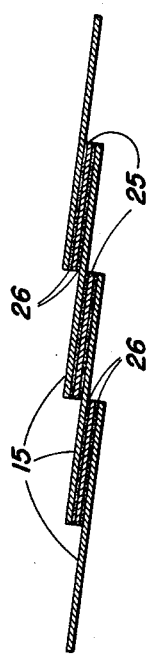
INVENTOR.
Curzon Dobell
BY   William J. Fox
ATTORNEY

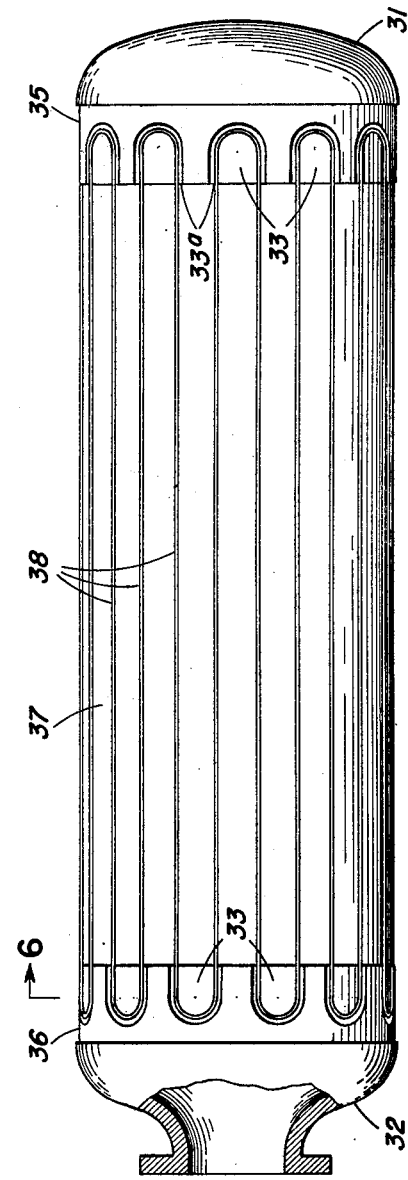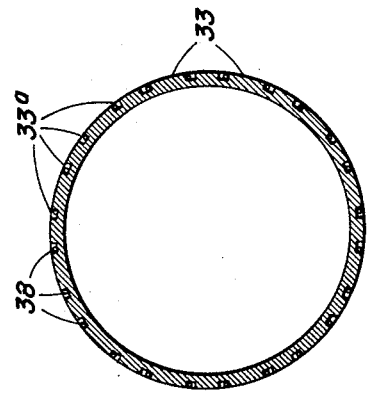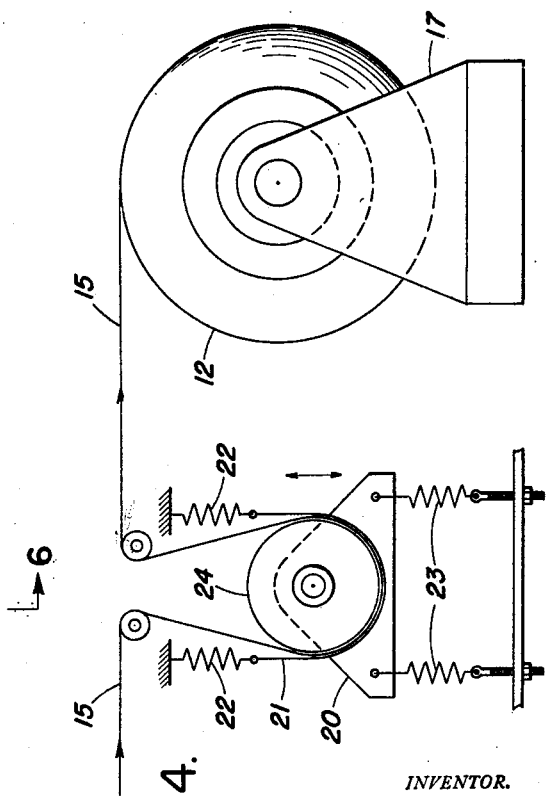

Jan. 22, 1963 C. DOBELL 3,074,584
PRESSURE VESSEL
Filed Sept. 28, 1959 3 Sheets-Sheet 3
Fig. 7.
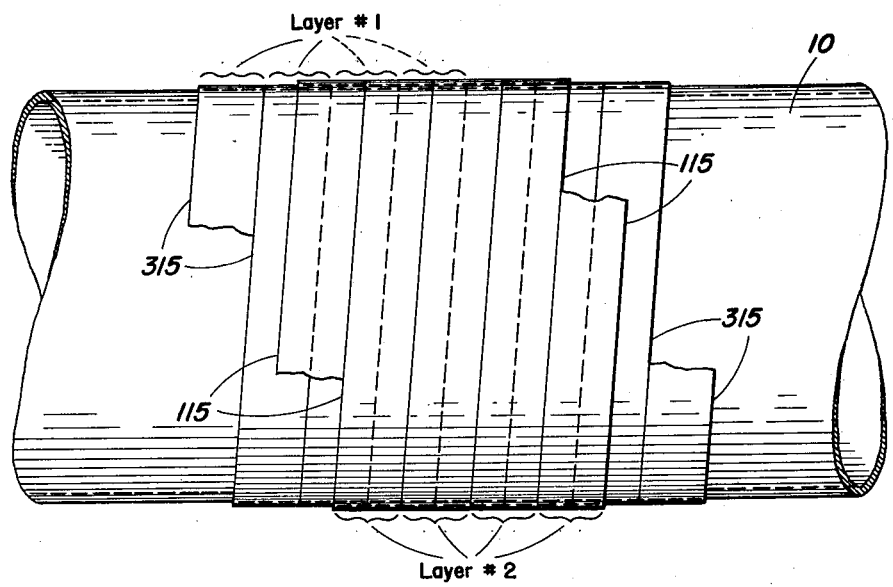
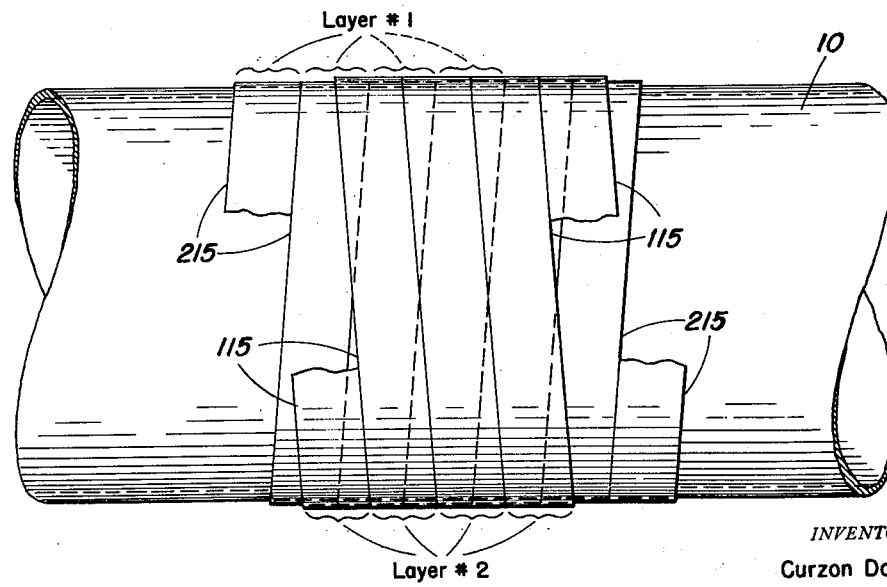
Fig. 8.
INVENTOR.
Curzon Dobell
BY
ATTORNEY

3,074,584
PRESSURE VESSEL

Curzon Dobell, Nassau, The Bahamas, assignor to Dorr-Oliver Incorporated, Stamford, Conn., a corporation of Delaware
Filed Sept. 28, 1959, Ser. No. 842,816
4 Claims. (Cl. 220—3)

This invention relates to pressure vessels, and more particularly to light-weight pressure vessels adapted to contain materials under conditions of high pressure, high temperature, or both, such as closed pressure vessels, or pressure pipes.

In the normal pressure vessel it is customary to use a cylinder of thick wall construction, normally of rolled steel, with the two edges butt-welded, lap-welded or riveted. The weakest portion of such a vessel is the joint and much consideration has been given to improving on this. In order to provide joints capable of withstanding the pressure and temperature conditions, it is necessary to use much heavier steel plate than would otherwise be required, thus greatly increasing the weight and cost. In addition, the securing of the ends to the sidewalls has been a problem in that it too must be welded, or otherwise attached, to the sidewalls, causing points of weakness.

This invention then proposes a new type of pressure vessel constructed from thin continuous stripping, usually of alloy steel or titanium, wound under tension in a continuous helix over a cylindrical core or removable mandrel.

It is an object of this invention to provide a lightweight yet pressure and/or temperature resistant vessel. It is a further object to provide a vessel to resist radial pressures by eliminating longitudinal joints. These and other objects will appear as this specification proceeds.

In summary, this invention accomplishes these objects by providing specially adapted end pieces on which there is brazed or otherwise connected a very thin metal strip, which is then wound continuously on the connecting portion of the end piece and further on a permanent core or removable mandrel, and finally on a second end piece to form a completed vessel. Very thin strips which possess great strength are overlapped and brazed or joined by adhesive to each other and eliminate the longitudinal joint and hence resist radial pressures. By developing such bond in the overlaps the flat strips will also develop considerable longitudinal strength. Alternatively, the strip may be wound diagonally with edges butted and if several layers are applied they may be brazed or bonded to each other to form a monolithic casing.

The end piece comprises a hemispherical head or similar type piece, on which is located a short longitudinal flange. A thin strip of alloy metal, which might vary in thickness between one five-thousandths of an inch to twelve ten-thousandths of an inch, and two inches wide, with its edges milled to remove edge defects, is wound around the flange projection on the end piece in either overlapping or butting fashion and then continued along extending past the flange and onto a core or mandrel. This strip continues along the core or mandrel until the desired length of tank is attained and is then passed onto a second flange on the opposite end piece, onto which it is wound and then bonded. When this is accomplished the metal stripping is brazed or bonded to itself and where a mandrel is used it may then be removed.

The metal strip is wound onto the end piece and the core under high tension, or under lower tension if applied on a removable mandrel. These tensions will vary over a wide margin depending on thickness of core, type of metal strip, etc. The stress might be applied in any one of a number of suitable ways, such as by passing the flat strip over a brake-drum-like arrangement which is subjected to a controlled rotational torque and thus applies a known tension on the strip. If the overlapping technique is used, the overlapping surface of the strip is coated with a bonding or brazing material, at least over the length of it, well overlapping the previous strip in the course of its length along the vessel. The brazing material can be applied as a separate narrow strip between layers of the principal metal strip to be brazed. A suitable brazing material for alloy steel has been found to be silver which, when heated, will form quite a strong bond between the layers of the thin metal provided they are under sufficient pressure during brazing. This material may also be used to braze each end of the metal strip to its respective end piece flanges. The amount of overlap which exists between the various layers of the thin metal stripping is in part a function of the pressure to which the tank will be subjected and can be easily controlled during manufacture. It has been found that the brazing, with silver particularly, has a high shear strength, but if it is necessary to increase the shear strength it may be done by adding an abrasive to the silver to increase the bonding longitudinal shear strength. This abrasive might be carborundum or any suitable abrasive, but must be of extremely fine particle size, which should not be over 50% of the thickness of the metal on either side of the joint.

If a mandrel is used, it may be any suitable type that can be removed from the inner portion of the vessel after construction. This might be either a metal collapsible mandrel or could be a sand core such as is used in foundries, which would then be broken up and removed from the inner portion of the vessel. It is also possible to provide a thermal mandrel of material which will melt out and be removed from the center of the vessel by the slight application of heat. Yet another possibility is to have a metal mandrel of smaller diameter than the vessel but coated with a sulfur coating to bring it up to the proper diameter. After construction the vessel is heated and the sulfur melts and may be poured off and the smaller metal mandrel removed. The end plates of the vessel, when fixed to the mandrel or core, are in turn mounted on a rotating vise, such as is used for rotating large objects like pipes or drums, and is rotated in the course of manufacture, with the tensioning means for the metal strip being held stationary.

In order to increase the longitudinal strength of the vessel, as an alternative embodiment there can be provided a series of grooves in the flange of the end pieces and a high tensile strength wire wound around these grooves, passed along the length of the vessel and wound around the grooves on the opposite end plate. This wire can be used continuously to make a circuit around the entire periphery of the vessel and then the two ends of the wire may be joined together by brazing or any other suitable means. The wire may be put on, preferably under tension, or may be applied in a slack condition and brought up to tension by providing a suitable longitudinal expanding mandrel. Grooves are also provided in the core or mandrel into which the wires are placed so that they do not project outside the surface of the core or mandrel.

Reference is now made to the drawings, in which there is shown a preferred embodiment of this invention. However, these are deemed to be illustrative only and the metes and bounds of this invention should be determined from the appended claims.

In the drawings, FIGURE 1 is a sectional elevation of the pressure vessel on the mandrel.

FIGURE 2 is a section through 2—2 of FIGURE 1.

FIGURE 3 is a section showing the overlapping strips of metal with the interconnecting material.

FIGURE 4 is a schematic showing of means for tensioning the metal strip.

FIGURE 5 is an alternative embodiment using high tensile wire for increasing longitudinal strength.

FIGURE 6 is a section through 6—6 of FIGURE 5.

FIGURES 7 and 8 show further methods of applying the metal strip.

More particularly in the drawings, there is provided a core or mandrel 10 of a length and diameter to be determined according to the size of the pressure vessel desired. At one end of the mandrel there is mounted an end piece 11, which has a curved head, attached to which is a flange 13. Flange 13 should be the same exterior diameter as the mandrel. The shoulder 14, formed between the curved head and the flange, should be just large enough to contain the strip which is wrapped around the flange.

At the opposite end of the mandrel there is provided a second head, or adaptor, 12, with a flange 16. This head is similar to head 11 at the opposite end, except that it has an open portion 27, through which it may be charged or attached to which by means of flanges 28 there may be mounted mixers or other suitable devices.

The thin metal strip 15 is brazed to the forward-most edge of the flange 16 and then is wrapped continuously along the flange 16 and along the mandrel 10 and finally along the flange 13 in overlapping relationship. The amount of the overlap will determine the amount of pressure that the vessel will contain. If this does not provide sufficient pressure resistance, an additional layer or layers of similarly placed strips may be applied one over the other. After the strip is wound onto the vessel, heat may be applied to the outer portion of the strip in order to cause the silver brazing material 25, or other brazing material, to bond the overlapping portions of the strip to each other. The mandrel, if one is used, is then removed and we have a finished pressure vessel. Carborundum abrasive 26 may also be added as shown in FIGURE 3.

In FIGURE 4 there is shown schematically a means of applying tension to the strip 15. This strip may be passed over a plate 20, on which is mounted a drum 24, around which is a brake arrangement 21. The plate 20 is spring-mounted by means of springs 23 to move in a transverse direction. The brake arrangement 21 is similarly spring-mounted by springs 22, in order to apply a varying pressure against the drum 24. The strip 15 passes around the drum and inside the brake and is subjected to a varying but predetermined pressure and hence tensioned by the amount of spring tension applied, either through springs 23 or springs 22. It then passes around the end piece flange 12 and onto the vessel as described. The mandrel and end pieces to be formed are mounted in turn in a chuck or similar arrangement 17, which is motor-driven so that they may be rotated.

In FIGURE 5 there is a further embodiment which may be utilized to provide high longitudinal strength. The end piece 31 has a flange 35, which has grooves 33a surrounding the center piece 33. A similar arrangement exists in opposite end piece 32 and its flange 36. When these are mounted on the mandrel 37, a high tensile strength wire 38 may be wrapped around each of the end pieces in the grooves 33a, around the respective center pieces 33, in continuous fashion until it completes a circuit around the periphery of the drum, at which point the two ends of the wires may be brazed or suitably connected.

As a protective device, to prevent distortion of the vessel, it may be necessary to provide a metal container around the vessel, particularly around the overlapping strips, during shipment and handling.

The core might be used in those situations where it is necessary to protect the structural part of the shell from heat by providing a core of insulating material. The layers of strip may be bonded to each other and to the core to provide a more unified vessel.

If this technique is used on pressure pipe the end closures would comprise axial flanges which would be part of a conventional bolted flange or bell and spigot connection between pipe sections.

The technique described may also be used to make spherical, dumb-bell and parabolic shapes. These can be made by having gradually curved, not angular, changes. If instead of a curved end section, a pointed section (bullet-shape) was desired, the wrapping could be continued over a suitably shaped mandrel or core.

FIGURES 7 and 8 show further embodiments in which the overlapping technique is not used. In these embodiments the strips 115 are butted side by side in close contact. They are then overlain in FIGURE 8 by strips 215 which are wound diagonally in an opposite direction. In FIGURE 7, the second layer 315 is wound in the same direction, with edges butted, but with the strips slightly displaced so that the butt edges of one layer do not fall directly over the layer underneath. Further layers may also be used. The layers may be brazed or bonded to each other and to the core if one is used.

I claim:

1. A pressure vessel comprising two preformed end sections, a system of longitudinal reinforcing elements of high tensile strength interconnecting said end sections under tension and spaced from one another along the inner periphery of the vessel, and a rigid tubular intermediate section surrounding said system of longitudinal reinforcing elements and interconnecting said end sections under longitudinal compression due to the tension of said longitudinal elements, the ends of said tubular section tightly surrounding said end sections in firmly bonded relationship therewith, whereby said system of reinforcing elements is entirely enclosed within said vessel, said tubular section consisting only of helically wound material, the windings of which are bonded with respect to one another to constitute said rigid section.

2. The pressure vessel according to claim 1, wherein said longitudinal re-inforcing elements are in the form of high tensile strength wire the end portion of which are counter-sunk in outward facing grooves provided in the periphery in said end sections.

3. The pressure vessel according to claim 1, wherein said longitudinal re-inforcing elements are in the form of a continuous wire looped back and forth between said end sections and comprising longitudinal wire portions extending between the end sections and wire bends extending between respective longitudinal wire portions, and wherein said wire bends are counter-sunk in the outer face of respective end sections.

4. The pressure vessel according to claim 1, wherein said helically wound material is in the nature of a thin strip, and wherein the windings of said strip have mutually overlapping relationship.

References Cited in the file of this patent

UNITED STATES PATENTS

| | | |
|---|---|---|
| 1,651,521 | Girardville | Dec. 6, 1927 |
| 1,696,725 | Murray | Dec. 25, 1928 |
| 2,109,529 | Goddard | Mar. 1, 1938 |
| 2,326,176 | Schierenbeck | Aug. 10, 1943 |
| 2,600,630 | Fergusson | June 17, 1952 |
| 2,652,943 | Williams | Sept. 22, 1953 |
| 2,744,043 | Ramberg | May 1, 1956 |

FOREIGN PATENTS

| | | |
|---|---|---|
| 117,303 | Great Britain | July 12, 1918 |